United States Patent
Jung et al.

(10) Patent No.: US 12,210,977 B2
(45) Date of Patent: Jan. 28, 2025

(54) ULTRA-HIGH SENSITIVE TARGET SIGNAL DETECTION METHOD BASED ON NOISE ANALYSIS USING DEEP LEARNING BASED ANOMALY DETECTION AND SYSTEM USING THE SAME

(71) Applicant: KOREA ADVANCED INSTITUTE OF SCIENCE AND TECHNOLOGY, Daejeon (KR)

(72) Inventors: Hee-Tae Jung, Daejeon (KR); Jihan Kim, Daejeon (KR); Youhan Lee, Daejeon (KR); Soo-Yeon Cho, Daejeon (KR); Hohyung Kang, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 996 days.

(21) Appl. No.: 17/120,914

(22) Filed: Dec. 14, 2020

(65) Prior Publication Data

US 2021/0216877 A1 Jul. 15, 2021

(30) Foreign Application Priority Data

Dec. 16, 2019 (KR) ........................ 10-2019-0167641

(51) Int. Cl.
*G06N 3/045* (2023.01)
*G06N 3/088* (2023.01)

(52) U.S. Cl.
CPC ............. *G06N 3/088* (2013.01); *G06N 3/045* (2023.01)

(58) Field of Classification Search
CPC ........ G06N 3/088; G06N 3/045; G06N 3/044; G06N 3/047; G06N 7/01; G06N 20/00; G06N 3/08; G06N 33/0062; G06N 2033/0068; G01N 33/0062; G01N 33/0068
See application file for complete search history.

(56) References Cited

PUBLICATIONS

Zhang et al., "Electronic Nose: Algorithmic Challenges", Springer Publishing (Year: 2018).*
Heredia et al., "Olfactory Classification using Electronic Nose System via Artificial Neural Network", IEEE (Year: 2016).*
Lavin et al., "On the Determination of Uncertainty and Limit of Detection in Label-Free Biosensors", MPDI Sensors (Year: 2018).*
Gardner, et al., "Novel Convolution-Based Signal Processing Techniques for an Artificial Olfactory Mucosa", IEEE (Year: 2009).*
(Continued)

*Primary Examiner* — Marshall L Werner
*Assistant Examiner* — Michael Joseph Guzniczak
(74) *Attorney, Agent, or Firm* — HULTQUIST, PLLC; Steven J. Hultquist

(57) ABSTRACT

Disclosed are an ultra-high sensitivity target signal detection method based on analysis of a noise signal of a sensor using deep learning based anomaly detection and a system using the same. More particularly, disclosed are a method and apparatus for receiving a noise signal from a sensor and inputting data to an artificial neural network trained with a normal noise signal to determine whether or not a target signal is present. The target signal detection method is capable of detecting a target signal having a very low concentration that can be detected by a conventional sensor, whereby the target signal detection method is useful in developing an ultra-high sensitivity sensor.

2 Claims, 7 Drawing Sheets
(6 of 7 Drawing Sheet(s) Filed in Color)

(56) References Cited

PUBLICATIONS

Nguyen et al., "Applications of Anomaly Detection using Deep Learning on Time Series Data", IEEE (Year: 2018).*

Raman et al., "Detecting and Recognizing Chemical Targets in Untrained Backgrounds With Temperature Programmed Sensors", IEEE (Year: 2012).*

Contaret, T., et al., "A Physics-Based Noise Model for Metallic Oxide Gas Sensors Characterization", Procedia Engineering, 2011, pp. 375-378, vol. 25, Publisher: Elsevier.

Fahad, H., et al., "Highly Sensitive Bulk Silicon Chemical Snsors with Sub-5 Nanometer Thin Charge Inversion Layers", ACS Nano, 2018, pp. 2948-2954, vol. 12, Publisher: ACS Publications.

Kim, S.J., et al., "Metallic Ti3C2Tx MXene Gas Sensors with Ultrahigh Signal-to-Noise Ratio", ACS Nano, 2018, pp. 986-993, vol. 12, Publisher: ACS Publications.

Lorincz, K., et al., "Sensor Networks for Emergency Response: Challenges and Opportunities", Pervasive Computing, 2004, pp. 16-23, vol. 3, Publisher: IEEE CS and IEEE Com Soc.

Shrivastava, A., et al., "Methods for the determination of limit of detection and limit of quantitation of the analytical methods", Chronicles of Young Scientists, 2011, pp. 21-25, vol. 2, No. 1.

Solis, J., et al., "Fluctuation-Enhanced Multiple-Gas Sensing by Commercial Taguchi Sensors", IEEE Sensors Journal, 2005, pp. 1338-1345, vol. 5, No. 6.

Zhang, C., et al., "A Deep Neural Network for Unsupervised Anomaly Detection and Diagnosis in Multivariate Time Series Data", Nov. 20, 2018, pp. arXiv:1811.08055v1 [csLG], Publisher: Association for the Advancement of Artificial Intelligence.

Lee, D-S, et al., "Intelligent Olfactory Sensor", ETRI Electronics and Telecommunications Trends, 2019, pp. DOI:https://doi.org/10.22648/ETRI.2019.J340408.

* cited by examiner

Sensor Measurement Setup: Clear room (20.5°C, relative humidity 30%, oxygen 21%, yellow light)

ULTRA-HIGH SENSITIVE TARGET SIGNAL DETECTION METHOD BASED ON NOISE ANALYSIS USING DEEP LEARNING BASED ANOMALY DETECTION AND SYSTEM USING THE SAME

BACKGROUND OF THE INVENTION

Field of the Invention

The present invention relates to an ultra-high sensitivity target signal detection method through analysis of a noise signal of a sensor using deep learning based anomaly detection and a system using the same, and more particularly to a method and apparatus for receiving a noise signal from a sensor and inputting data to an artificial neural network trained with a normal noise signal to determine whether or not a target signal is present.

Description of the Related Art

Chemical and biological detection technology is one of the main themes mentioned in the fourth industrial revolution, since it is important to track invisible but harmful environmental substances (K. Lorincz, et al., IEEE Pervasive Comput. 3, 16-23, 2004). In particular, a sensor configured to detect a gas or a gaseous chemical analyte may be utilized in various applications including analysis of respiration of medical patients, smart home systems, industrial safety technology, and air pollution tracking (H. M. Fahad et al., ACS Nano 12, 2948-2954, 2018). A signal to noise ratio measured in all of these applications must be sufficient to confirm whether detection has been actually performed (A. Shrivastava et al., Chron. Young. Sci. 2, 21-25, 2011). A concept known as limit of detection (LOD) is used to distinguish between presence and absence of a target substance at the time of detection in analytical chemistry. In most sensing applications, the amount of an analyte is very small and thus may not be detected even using the most advanced detection apparatus depending on circumstances. Research and development of new target substance detection technology have been conducted so as to exceed the current LOD in order to improve the ability to detect a target substance at the molecular level (S. J. Kim et al., ACS Nano 12, 986-993, 2018).

On the other hand, extraordinary research has not been conducted on generation of a signal near or below LOD within a noise fluctuation level within which a signal is lost even in the case in which a signal is present. A detection theory other than a sensing technology field relates to a field having an important point in distinguishing a signal pattern containing information from random noise. Typically, fluctuation enhanced chemical sensing (FECS) and Langmuir/Wolkenstein adsorption models are widely used to detect a chemical fingerprint in a noise level (J. L. Solis et al., IEEE. Sens. J. 5, 1338-1345, 2005; T. Contaret et al., Procedia Eng. 25, 375-378, 2011).

Anomaly detection generally refers to a technique for distinguishing between a normal state and an abnormal state, and various mathematical techniques have been studied and used for a long time. However, it is difficult for conventional techniques to flexibly deal with unstable and complex data obtained from various gas sensors and various target gases. In recent years, machine learning based algorithms have been applied to this field; however, it is difficult to secure samples of a dangerous gas or an explosive gas as a target, whereby a conventional supervised learning algorithm has limitations.

There are various types of gas sensors, such as a solid sensor, an electrochemical sensor, an infrared sensor, and an optical ion sensor. In order to acquire much information in various spaces, however, the sensor must be inexpensive, power consumption of the sensor must be low, and the sensor must be easily connected to an IT device. To this end, a gas sensor using a resistance change in electricity may be appropriately used.

In order to sense a very small amount of gas, conventional research focused on increasing sensor sensitivity while incurring a change in resistance by adjusting nanosubstances constituting a gas sensor/the surface chemical structure thereof. However, this incurred a decrease in reproducibility and universality and also increased processing cost. Consequently, there are limitations in practical use.

Furthermore, conventionally, a limit of detection (LOD) concept of, when a signal due to a target gas has a signal to noise ratio of 3 or less, determining the signal as a sensing signal was used. However, this concept is based on statistical confidence and is limited in determining a micro-scale signal due to a very small amount of gas equal to or less than LOD.

Under such a technical background, the inventors of the present application have made wholehearted efforts to develop an ultra-high sensitivity sensor system exceeding a conventional limit of detection and have found that, when a noise signal is analyzed using an artificial neural network, it is possible to detect a target signal having a concentration that can be detected by a conventional sensor. The present invention has been completed based on these findings.

SUMMARY OF THE INVENTION

It is one object of the present invention to provide a method of detecting a target signal based on deep learning.

It is another object of the present invention to provide an apparatus for detecting a target signal.

It is yet another object of the present invention to provide a sensor for detecting a target signal including the apparatus.

It is a further object of the present invention to provide a computer-readable storage medium including a method of detecting a target signal based on deep learning.

In accordance with an aspect of the present invention, the above and other objects can be accomplished by the provision of a method of detecting a target signal based on deep learning including (a) receiving a noise signal from a sensor and (b) inputting the noise signal to an artificial neural network capable of determining whether or not a target signal is present, and then determining whether or not the target signal is present.

In accordance with another aspect of the present invention, there is provided an apparatus for detecting a target signal including a signal reception unit configured to receive a noise signal, an input unit configured to allow the signal to be input to an artificial neural network, a determination unit configured to determine whether or not a target signal is present using the artificial neural network, and an output unit configured to output whether or not the target signal is present.

In accordance with yet another aspect of the present invention, there is provided a sensor for detecting a target signal comprising the apparatus.

In accordance with a further aspect of the present invention, there is provided a computer-readable storage medium including a command configured to be executed by a processor configured to detect a target signal, wherein the computer-readable storage medium includes a command configured to be executed by a processor configured to detect a target signal through the steps of (a) receiving a noise signal from a sensor and (b) inputting the noise signal to an artificial neural network capable of determining whether or not a target signal is present, and then determining whether or not the target signal is present.

Effects of the Invention

A target signal detection method according to the present invention is capable of detecting a target signal having a very low concentration that cannot be detected by a conventional sensor, whereby the target signal detection method is useful in developing an ultra-high sensitivity sensor and is applicable to various targets as a rapid and simple learning model.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and other advantages of the present invention will be more clearly understood from the following detailed description taken in conjunction with the accompanying drawings, in which.

DETAILED DESCRIPTION OF THE INVENTION

Figure 1:
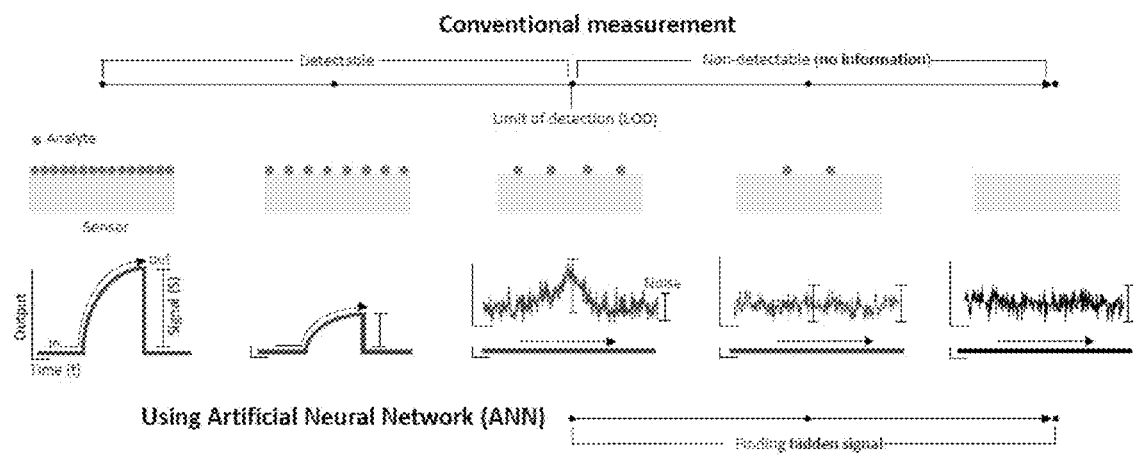
FIG. 1 is a schematic view of a noise signal analysis method based on an artificial neural network.
Figure 2:
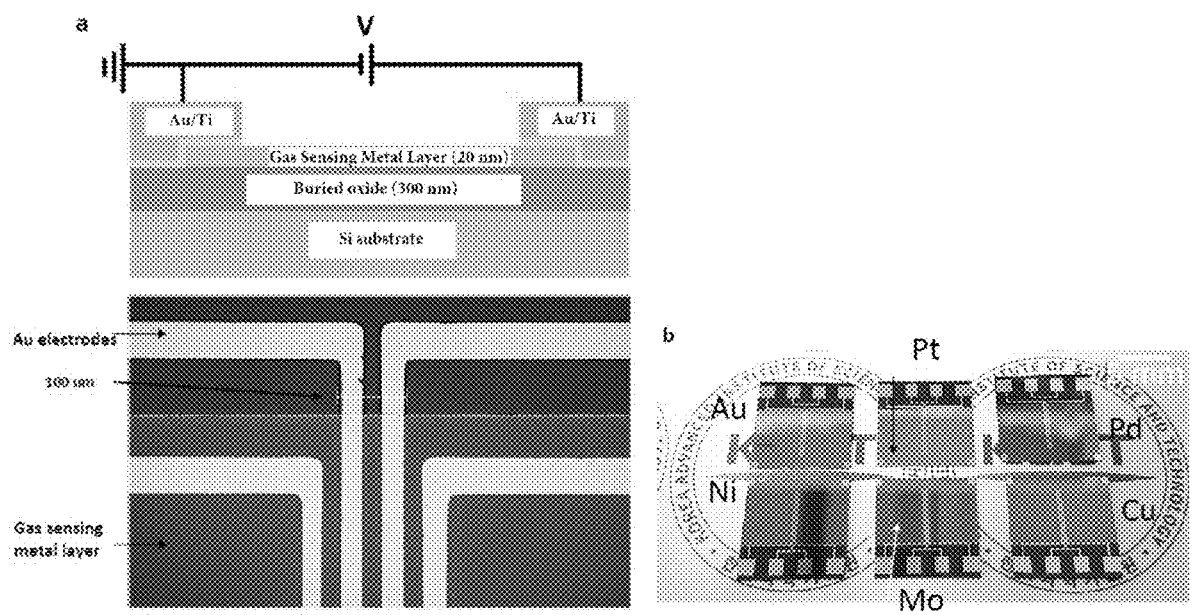
FIG. 2 is a schematic view (a) of a sensor apparatus for gas signal noise analysis according to an embodiment of the present invention and an actual photograph (b) thereof.

Unless defined otherwise, all technical and scientific terms used herein have the same meanings as appreciated by those skilled in the field to which the present invention pertains. In general, the nomenclature used herein is well-known in the art and is ordinarily used.

Although the terms "first", "second", "A", "B", etc. may be used herein to describe various elements, the elements should not be understood to be limited by these terms, which are used only to distinguish one element from another. For example, within the scope defined by the present invention, a first element may be referred to as a second element and similarly, a second element may be referred to as a first element. The term "and/or" includes any and all combinations of one or more of the associated listed items.

Singular forms are intended to include plural forms as well, unless the context clearly indicates otherwise. It will be further understood that the term "comprises", etc., when used in this specification, specify the presence of stated features, numbers, steps, operations, elements, components or combinations thereof, but do not preclude the presence or addition of one or more other features, numbers, steps, operations, elements, components, or combinations thereof.

Before giving a detailed description of the drawings, it is necessary to make it clear that, in this specification, components are divided based on main functions of each component. That is, two or more components that will be described below may be combined into a single component, or a single component may be divided into two or more components based on subdivided functions. In addition, each component that will be described below may further perform some or all of functions of another component in addition to main functions thereof, and some of the main functions of each component may be exclusively performed by another component.

Also, in performing a method or an operation method, processes constituting the method may be performed in a sequence different from the specified sequence, unless the context clearly indicates otherwise. That is, the processes may be performed in the same sequence as the specified sequence, may be substantially simultaneously performed, or may be performed in a reverse sequence.

In the present invention, it was confirmed that, when a noise signal of a sensor containing a target substance having a concentration less than LOD is input to an artificial neural network trained with a normal noise signal, it is possible to determine whether or not the target substance is present.

That is, in an embodiment of the present invention, it was confirmed that, when an artificial neural network is trained with noise signals of gold (Au), copper (Cu), molybdenum (Mo), nickel (Ni), platinum (Pt), and palladium (Pd) metal sensors in the state in which the content of nitrogen ($N_2$) gas is 100%, a nitrogen gas mixture including hydrogen ($H_2$) gas having a concentration of 2.5 to 10 ppm is injected into the metal sensors to measure noise signal data, and the measured noise signal data are input to the artificial neural network, not only the Pt and Pd sensors, which are generally known to successfully detect hydrogen, but also other metal sensors are capable of detecting hydrogen gas at less than a conventional known detection limit value (FIGS. 1 to 3 and 8).

In one aspect, therefore, the present invention relates to a method of detecting a target signal based on deep learning including:

(a) receiving a noise signal from a sensor; and
(b) inputting the noise signal to an artificial neural network capable of determining whether or not a target signal is present, and then determining whether or not the target signal is present.

In the present invention, the sensor is not particularly restricted as long as the sensor is a kind of sensor capable of detecting a target signal. Preferably, it is characterized in that the sensor is a solid sensor, an electrochemical sensor, an infrared sensor, or an optical ion sensor, although the sensor is not limited thereto.

In the present invention, the target signal is not particularly restricted as long as the target signal is a kind of signal changeable depending on whether or not a target is present by time.

For example, in the case in which an electrochemical sensor is used as a gas detection sensor, a target substance (e.g. $CO_2$) is present in the state of reaching a detection limit or higher, a change in resistance on the surface of the sensor occurs in proportion to the concentration of the target substance, and the sensor detects the same to generate a target signal.

For example, whether or not a target antigen is present in a sample using an antigen-antibody reaction is determined through enzyme-linked immunosorbent assay (ELISA). In the case in which the target antigen is present, the intensity of fluorescence is increased over time as a target signal, whereby it is determined that the target antigen is present.

For example, for an electrochemical sensor configured to detect formaldehyde, which is a volatile organic compound (VOC), in the case in which the concentration of formaldehyde in air exceeds a detection limit value, a resistance value on the surface of the sensor is changed over time to generate a target signal.

For example, for a fire detection sensor configured to detect flames through image analysis, a flame image in an image exceeding a reference value is detected over time, whereby a target signal is generated to detect fire.

For example, for a sensor configured to detect a specific biomarker in blood, a change in fluorescence/electrical signal of a substance capable of reacting with a biomarker is detected over time to generate a target signal.

For example, for a radiation detection sensor, a target signal is generated depending on the amount of radiation that is measured to detect whether or not the radiation is present.

For example, for a leakage detection sensor, when a leaking material is accumulated or detected in a detection line in a predetermined amount or more, a target signal is generated to detect whether or not leakage occurs.

For example, a flame detection sensor used in a gas turbine detects flames in a gas turbine combustion compartment using an optical diode and generates a target signal when the same is a predetermined value or more.

For example, for a deformation detection sensor, a target signal is generated using a change in resistance value and the like depending on various deformation states of an apparatus, such as pushing, bending, and twisting.

The present invention is characterized in that the noise signal is a signal equal to or less than the limit of detection (LOD) of the sensor.

That is, the intensity of a signal generated by the sensor must be changed to a predetermined reference value or more in order to determine whether or not a target signal is present, and such a reference value may be LOD. In the present invention, a signal less than LOD, i.e. a signal classified as noise in a conventional sensor system, is analyzed to determine whether or not a target signal is present.

The present invention is characterized in that the artificial neural network is trained with a noise signal including no target signal.

Figure 4:
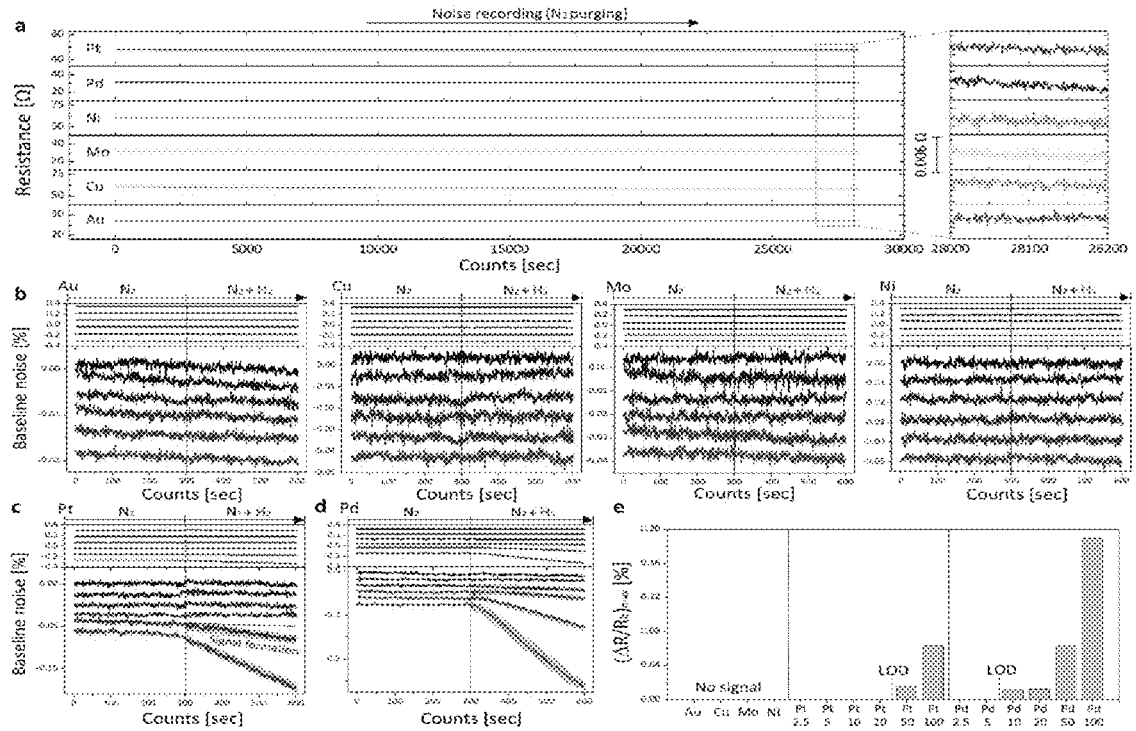
FIG. 4 shows noise profile measurement results of a metal sensor according to an embodiment of the present invention, wherein (a) is a graph showing a noise profile in an N2 environment for each metal sensor, (b) is a graph showing a real-time noise profile measurement result for each of Au, Cu, Mo, and Ni metal sensors depending on 2.5 to 100 ppm $H_2$ exposure, (c) is a graph showing the result of a Pt sensor, (d) is a graph showing the result of a Pd sensor, and (e) is a graph showing maximum signal amplitudes $(\Delta R/Rb)_{max}$ of each metal sensor together with LOD.
Figure 5:
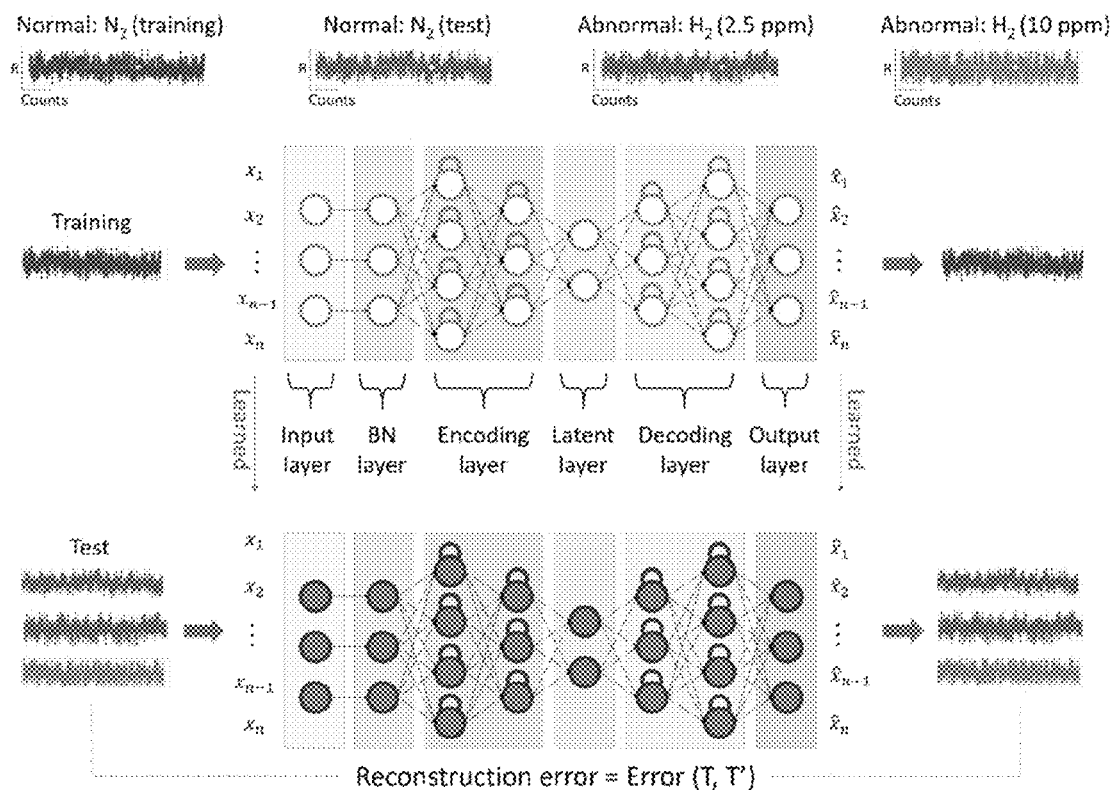
FIG. 5 is a flowchart of an anomaly detection method based on semi-supervised learning using an autoencoder according to an embodiment of the present invention.
Figure 6:
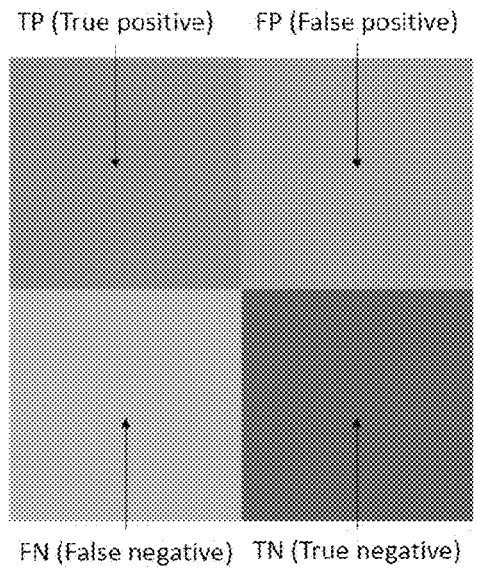
FIG. 6 is a conceptual view showing a matrix for calculating accuracy and the like of an artificial neural network according to an embodiment of the present invention.
Figure 7:
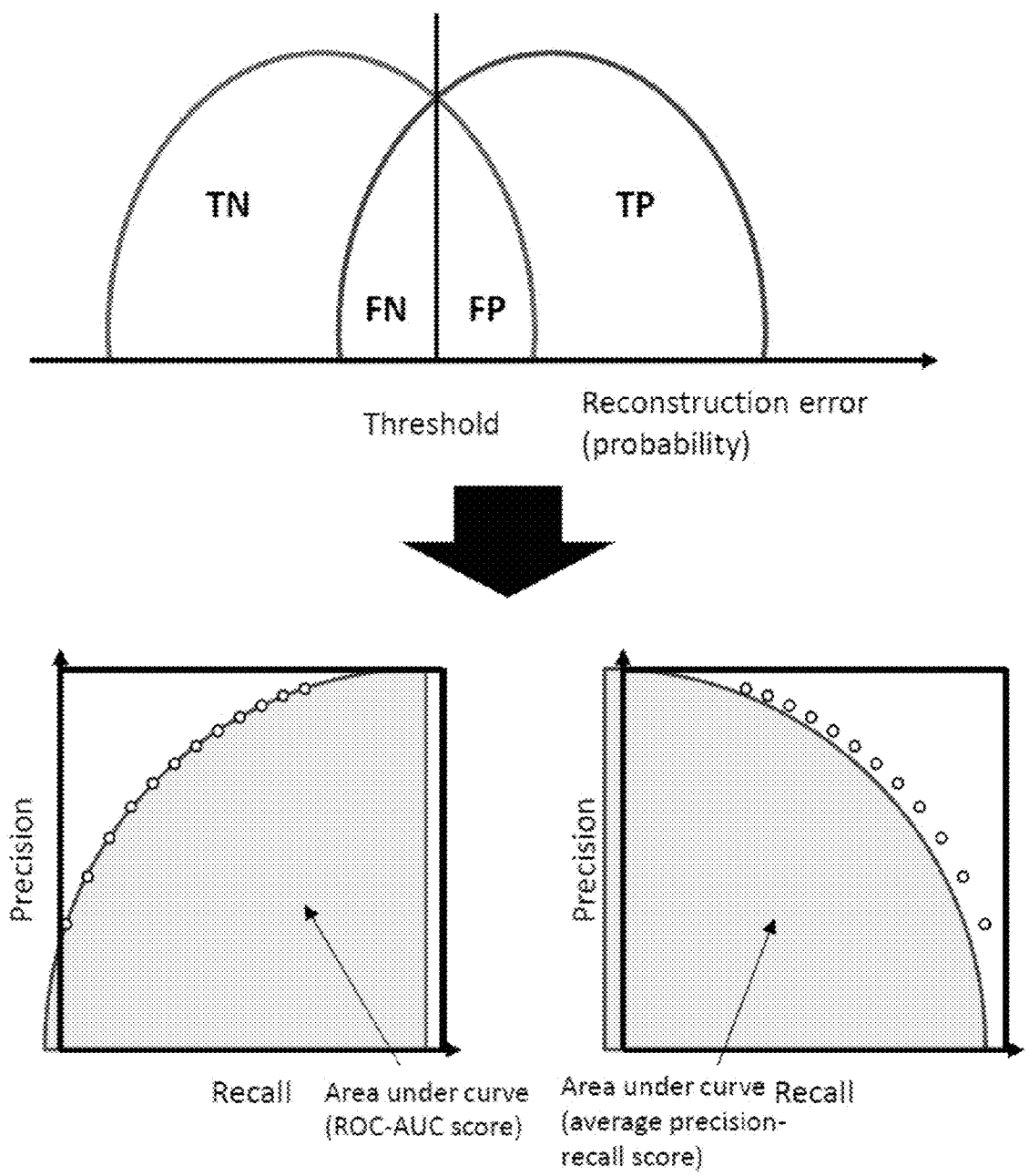
FIG. 7 is a conceptual view showing definition of a graph for evaluating reliability of the artificial neural network according to the embodiment of the present invention.

For example, in an embodiment of the present invention, the artificial neural network is trained with a noise signal generated as the result of 100% nitrogen gas being injected into a metal sensor. Subsequently, a noise signal generated as the result of a gas mixture including a target substance (hydrogen gas) having a value less than LOD being injected into the metal sensor is input to the trained artificial neural network in order to determine whether or not the noise signal input to the artificial neural network is 100% nitrogen gas (FIGS. 4 to 6).

As a result, it is confirmed that the artificial neural network determines that each of the noise signals generated by all metal sensors is not 100% nitrogen gas with high accuracy.

In the present invention, the artificial neural network is not particularly restricted as long as the artificial neural network is an artificial neural network trained in order to determine whether or not input data are normal. Preferably, the present invention is characterized in that the artificial neural network is one selected from the group consisting of a Gaussian mixture model, a histogram-based model, a cluster-based model, and an autoencoder.

The present invention is characterized in that the autoencoder is one selected from the group consisting of a stacked autoencoder, a denoising autoencoder, a stacked denoising autoencoder, a sparse autoencoder, a variational autoencoder, a contractive autoencoder, an LSTM (long-short term memory)-based autoencoder, a GRU (gated recurrent units)-based autoencoder, a CNN (convolutional neural network)-based autoencoder, a generative adversarial neural network, a vanilla recurrent neural network, and an attentive recurrent neural network, although the autoencoder is not limited thereto.

The present invention is characterized in that, in the step of determining whether or not the target signal is present, the artificial neural network reconstructs, analyzes, and determines the input noise signal.

The present invention is characterized in that the analysis is comparing a reconstruction error rate of a noise signal including no target signal with a reconstruction error rate of an input noise signal and determining that a target signal is included when the result of comparison exceeds a reference value (a cut-off value).

In order to decide the reference value, the same process may be performed on an evaluation data set, a reference value that makes anomaly performance (accuracy) the best may be set for the evaluation data set, and the reference value may be applied to an actual sensor.

The present invention is characterized in that the reconstruction error rate is used as a loss function of an autoencoder and is calculated by Equation 1 below.

$$RE = \frac{1}{N}\sum_{n=1}^{N}(Y_i - \hat{Y}_i)^2 \quad \text{Equation 1}$$

Where N is a vector length of a time-series sample, $Y_i$ is a sample value of time i for a given input vector, and $\hat{Y}_i$ is a reconstructed output value.

In an embodiment of the present invention, the autoencoder is optimized using only a normal sequence, whereby it is possible to distinguish between a normal case and an abnormal case using RE collection and distribution (e.g. kernel density estimation plot or KDE).

In another aspect, the present invention relates to an apparatus for detecting a target signal including a signal reception unit configured to receive a noise signal, an input unit configured to allow the signal to be input to an artificial neural network, a determination unit configured to determine whether or not a target signal is present using the artificial neural network, and an output unit configured to output whether or not the target signal is present.

In another aspect, the present invention relates to a sensor for detecting a target signal including the apparatus.

In a further aspect, the present invention relates to a computer-readable storage medium including a command configured to be executed by a processor configured to detect a target signal, wherein the computer-readable storage medium includes commands configured to be executed by a processor configured to detect a target signal through the steps of (a) receiving a noise signal from a sensor and (b) inputting the noise signal to an artificial neural network capable of determining whether or not a target signal is present, and then determining whether or not the target signal is present.

EXAMPLES

Hereinafter, the present invention will be described in more detail with reference to the following examples. However, it will be obvious to those skilled in the art that the following examples are provided only for illustration of the present invention and should not be construed as limiting the scope of the present invention based on the subject matter of the present invention.

<Experimental Method>
Sensor Manufacture and Measurement Data Production

In order to measure noise profiles and detection signals of Au, Pd, Pt, Ni, Cu, and Mo, six metal films having a thickness of 20 nm were deposited on a predefined area of an $SiO_2$/Si substrate using e-beam evaporation, and a pre-deposited Ti adhesive layer having a thickness of 5 nm and an Au electrode having a spacing and a width of 100 μm and having a thickness of 70 nm were deposited through e-beam evaporation using a customized SERS mask. Manufactured sensors were mounted in a detection chamber designed to measure a resistance signal using a data collection module (Agilent 34970A).

Figure 3:
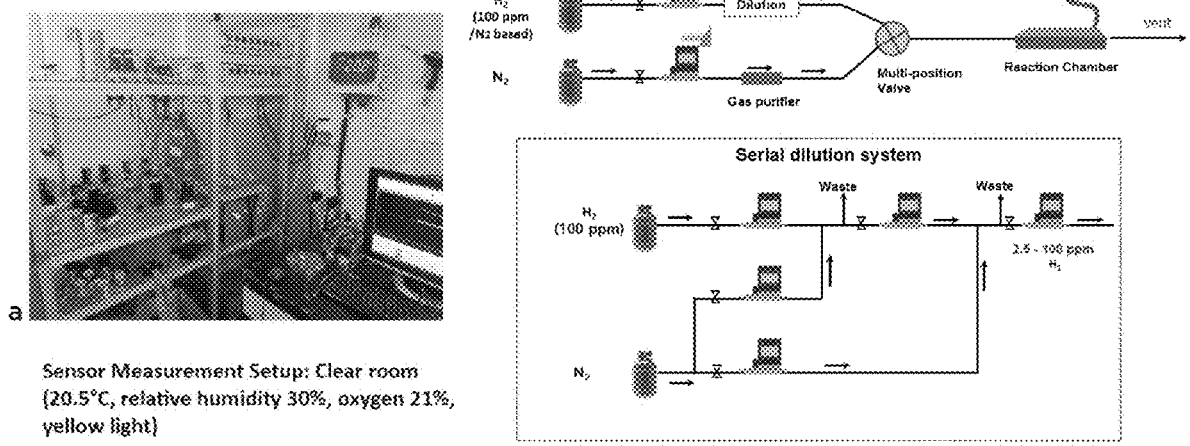
FIG. 3 shows a noise signal analysis apparatus according to an embodiment of the present invention, wherein (a) is a photograph of a laboratory actually configured in a clean room and (b) is a schematic view of an overall gas transmission system.

$H_2$ gas was allowed to pass through the detection chamber. The flow of the gas to the detection chamber was controlled using a gas transmission system designed to measure the reaction of the sensors to an analyte. A continuous dilution system used to control the concentration of $H_2$ at 2.5 ppm and 3% was constituted by a mass flow controller (MFC, Brooks 5850E), a Teflon tube (PFA, ⅛"), and Lok type fitting and valve system. $N_2$ was used as a reference gas, and the total flow rate of the reference gas and the tested $H_2$ was maintained at 400 sccm. $H_2$ and $N_2$ were injected for 6 to 12 hours. The size of the hermetically sealed gas detection chamber was about 10 cm (width)×5 cm (length)×8 mm (height) (FIG. 3).

Indices Used for Analysis

When a specific critical value is set from a reconstruction error (RE) calculated from AE, setting was performed such that a sample having a lower reconstruction error than the critical value is labeled normal and a sample having a higher reconstruction error than the critical value is labeled abnormal. Various indices were applied in order to evaluate AE classification performance using a predicted label and an actual label. In the present invention, accuracy, precision, recall, and F1-score were calculated as shown in FIG. 6.

In order to synthetically analyze the performance of a classifier, a receiver operation characteristic (ROC) curve and a precision recall curve were selected. The ROC curve is a well-known criterion used to predict the latent performance of the classifier. The ROC curve is generated by plotting a true positive rate (TPR) to a false positive rate (FPR) at various critical values. A region under the ROC curve is an AUC score having a range of 0 to 1. When the score approximates to 1, this means that samples are successfully classified, whereby anomaly detection performance is improved. In the same manner, the precision recall curve is frequently used and indicates the balance between precision and recall. The curve is indicated by precision, and is recalled as various critical values. In the same manner as in the ROC-AUC score, it is possible to evaluate whether the classifier successfully provides correct results and returns most of all positive results (average precision recall score) using a region under the curve.

Data Collection

In order to obtain a stable and clean $N_2$ resistance sample, $N_2$ was purged for 12 hours or more, and the newest resistance before $H_2$ 2.5 ppm insertion was used for training and test. $N_2$ (training) and $N_2$ (test) were prepared through a random interval sampling strategy using a sliding window technique. In the sampling, an arbitrary interval is inserted between the $N_2$ (training) region and the $N_2$ (test) region, whereby there is no overlap therebetween. Sliding window sampling was applied to the two regions to acquire an order for supply to the neural network. For $H_2$ (2.5 ppm), sampling was started 200 seconds after $H_2$ (2.5 ppm) insertion. An input sequence of this region was also prepared using a sliding window method. Manufacture of $H_2$ (10 ppm) is completely identical to manufacture of $H_2$ (2.5 ppm). In order to concentrate a fluctuation in the sequence, gradient information calculated from a poly1d function included in NumPy, which is a python library, was subtracted to remove gradients of all sequences.

In order to find the optimum input sequence length, anomaly detection performance was estimated using five various time lengths (i.e. $\Delta T$=128, 256, 512, 1024, and 2048 seconds). A Pd sensor was selected from among four different samples to develop GRU-AE. In order to evaluation performance, ROC-AUC scores were calculated for $N_2$ (test) and $H_2$ (2.5 ppm) at 128, 256, 512, 1024, and 2048 seconds, and the results were 0.533, 0.599, 0.512, 0.544, and 0.817. For $N_2$ (test) and $H_2$ (10 ppm) at 128, 256, 512, 1024, and 2048 seconds, ROC-AUC scores were 0.557, 0.617, 0.566, 0.593, and 0.874. Consequently, 2048 seconds was selected and applied to all learning processes.

For FFT-GRU-AE, a one-dimensional discrete Fourier transform was applied to each sequence at a length of 2048 and a sampling speed of 16,384 optimized as the result of using fftpack of SciPy, which is an open source python library widely used in mathematics, science, and engineering. The calculated frequency data were symmetrical (a positive frequency and a negative frequency) and half of the frequency (the negative frequency) was removed. Finally, the input length of FFT-GRU-AE, which is a vector including the amplitude of a corresponding frequency, was set to 1024, which is ½ of the optimum time sequence length.

Artificial Neural Network Selection

In order to decide a high-performance approach method to this gas detection application field, ROC-AUC score, $H_2$ (2.5 ppm), and $H_2$ (10 ppm) were calculated by the Pd sensor through various anomaly detection methods using a deep learning algorithm.

(i) Gaussian mixture model: It is assumed that normal data are derived from Gaussian distribution, and therefore Gaussian for a normal state optimizes parameters of distribution and is thus suitable according to maximum likelihood. In an estimated Gaussian model, a normal state has a high probability, and an abnormal state has a low probability. It is possible to distinguish between normality and abnormality using probability.

(ii) Histogram-based model: A histogram and bins for normality are calculated in order to approximate normal distribution for each feature, and it is confirmed in which bin data instance normal and abnormal bin data instances are included. Classification is performed using the heights of bins as exception scores. In the case in which the score is low, data are not frequent in a general histogram bin, which is determined to be exception.

(iii) Cluster-based model: Clusters were found from all data using a specific algorithm. A k-means algorithm, which is well-known as being easily used, was selected. This algorithm minimizes fluctuation in the distance between data points of the same cluster in order to acquire two clusters (normal and abnormal). A prediction label is compared with a given real label using the clusters, whereby anomaly detection performance is expected. In addition, since removal of time-series noise before learning is a general method for obtaining high classification performance, various noise removal methods were applied to input data of preprocessing.

(iv) Autoencoder: A variational autoencoder, an LSTM (long-short term memory)-based autoencoder, GRU (gated recurrent units)-based autoencoder, a CNN (convolutional neural network)-based autoencoder, and a generative adversarial neural network were tested.

Structure of Artificial Neural Network

In order to capture an $N_2$ pattern, a symmetrical down-complete GRU-based autoencoder was developed using a Keras python deep learning library. A normalization layer is inserted into the start part of the neural network to normalize input. An encoding layer includes two GRU layers, and the third dimension of each layer may be reduced to half of the previous layer. The length of a hidden layer is 256 for both GRU-AE and FFT-GRU-AE. A decoding layer includes two GRU layers, and the third dimension of each layer is twice that of the previous layer. The total number of GRU-AE parameters is 36,739,328, and the total number of FFT-GRU-AE parameters is 21,000,448.

TABLE 1

Detailed structure of GRE-AE

| Name of layer | Type | Shape | Number of parameters |
|---|---|---|---|
| Input layer | Input | (None, 1, 2048) | None |
| BN layer | BatchNormalization | (None, 1, 2048) | 8,192 |
| Encoding layer 1 | GRU | (None, 1, 1024) | 9,443,328 |
| Encoding layer 2 | GRU | (None, 1, 512) | 2,362,368 |
| Latent layer | Dense | (None, 256) | 131,328 |
| Decoding layer 1 | GRU | (None, 1, 512) | 1,182,720 |
| Decoding layer 2 | GRU | (None, 1, 1024) | 4,724,736 |
| Output layer | GRU | (None, 1, 2048) | 18,886,656 |

TABLE 2

Detailed structure of FFT-GRU-AE

| Name of layer | Type | Shape | Number of parameters |
|---|---|---|---|
| Input layer | Input | (None, 1, 2048) | None |
| BN layer | BatchNormalization | (None, 1, 2048) | 4,096 |
| Encoding layer 1 | GRU | (None, 1, 1024) | 6,297,600 |
| Encoding layer 2 | GRU | (None, 1, 512) | 2,362,368 |
| Latent layer | Dense | (None, 256) | 131,328 |
| Decoding layer 1 | GRU | (None, 1, 512) | 1,182,720 |
| Decoding layer 2 | GRU | (None, 1, 1024) | 4,724,736 |
| Output layer | GRU | (None, 1, 2048) | 6,297,600 |

Training of Artificial Neural Network

All training was performed for 2000 epochs. An Adam optimizer was used at a batch size of 128 to optimize the weight of the neural network. A training ratio was an exponential decay ratio of primary moment estimation at $10^{-3}$, $\beta_1$ was 0.9, an exponential decay ratio of secondary moment estimation, $\beta_2$ was 0.999, and $\varepsilon$ was $10^{-8}$ (basic setting of Keras library). $N_2$ (test) was used as verification data, and an early termination method was adopted. That is, loss of verification is monitored, and in the case in which loss is not reduced at the latest 60 epochs, training is terminated. All training was performed using an NVIDIA GTX 1080 Ti, and was performed in the state in which batch samples are randomly mixed in order to reduce unnecessary errors in continuity of time series. Back-end for optimizing the entire neural network is Tensorflow, which is a deep learning frame work made by Google.

Example 1: Noise Signal Measurement

Noise signals were measured and collected in a gas detection chamber using a method described in connection with sensor manufacture and measurement data production.

As a result, as shown in FIG. 4 in graph (a), real-time noise profiles of six sensors in an $N_2$ atmosphere indicate very uniform and stable real-time reference lines without fluctuation over time, and the enlarged profiles show that six metal channels have similar noise fluctuations at a level of several mΩ (0.001% scale), which is caused by the properties of high-conductivity metal channels (FIG. 4 in graph (a), right).

For profiles of the Au, Cu, Mo, and Ni sensors having an analyte ($H_2$) concentration increasing from 2.5 ppm to 100 ppm in an $N_2$ atmosphere (1 count; 1 second), a remarkable change in signal pre/post in which $H_2$ flows into the system cannot be detected even at a high $H_2$ concentration (100 ppm) (FIG. 4 in (b)), whereas for Pt, it was confirmed that the resistance reference line of a signal starts to be reduced at 50 ppm $H_2$ exposure (FIG. 4 in (c)).

Finally, for the Pd sensor, a change in resistance reference line occurred at 10 ppm $H_2$ exposure (FIG. 4 in (d)), and the maximum values of the maximum signal amplitudes of the Au, Cu, Mo, Ni, Pt, and Pd sensors to 2.5 to 100 ppm $H_2$ exposure (ΔR/Rb) are shown in FIG. 4 in (e).

Sensor signals are observed only at the Pt and Pd channels having 50 ppm and 10 ppm $H_2$ or more, which accords with preliminary observation in that Pt and Pd are well-known $H_2$ detection substances using a surface scattering mechanism and phase transition from α to β.

Example 2: Artificial Neural Network Selection

The performance of various kinds of artificial neural networks was evaluated, and the results are shown in Table 3 and 4 below.

TABLE 4

| Case | Fully-connected auto-encoder | LSTM-based auto-encoder | CNN1D-based auto-encoder | Variational auto-encoder | GRU-based auto-encoder (Our work) | AnoGAN |
|---|---|---|---|---|---|---|
| ROC-AUC score 2.5 ppm/ 10 ppm | 0.806/ 0.871 | 0.794/ 0.868 | 0.726/ 0.797 | 0.819/ 0.873 | 0.828/ 0.884 | 0.749/ 0.760 |

It was confirmed from the results that the performance of the GRU-based autoencoder is the highest, among various kinds of artificial neural network learning models.

Example 3: Learning Model Performance Verification

The performance of the autoencoder was confirmed by calculating a reconstruction error rate using Equation 1 below.

$$RE = \frac{1}{N}\sum_{n=1}^{N}(Y_i - \hat{Y}_i)^2 \qquad \text{Equation 1}$$

Where N is a vector length of a time-series sample, $Y_i$ is a sample value of time i for a given input vector, and $\hat{Y}_i$ is a reconstructed output value.

Input data were configured in the state of being divided into (1) a data set consisting of raw resistance values (for a GRU-AE model) and (2) a data set consisting of amplitude vectors of frequencies obtained by performing fast Fourier transform (for a FFT-GRU-AE model).

Figure 8:
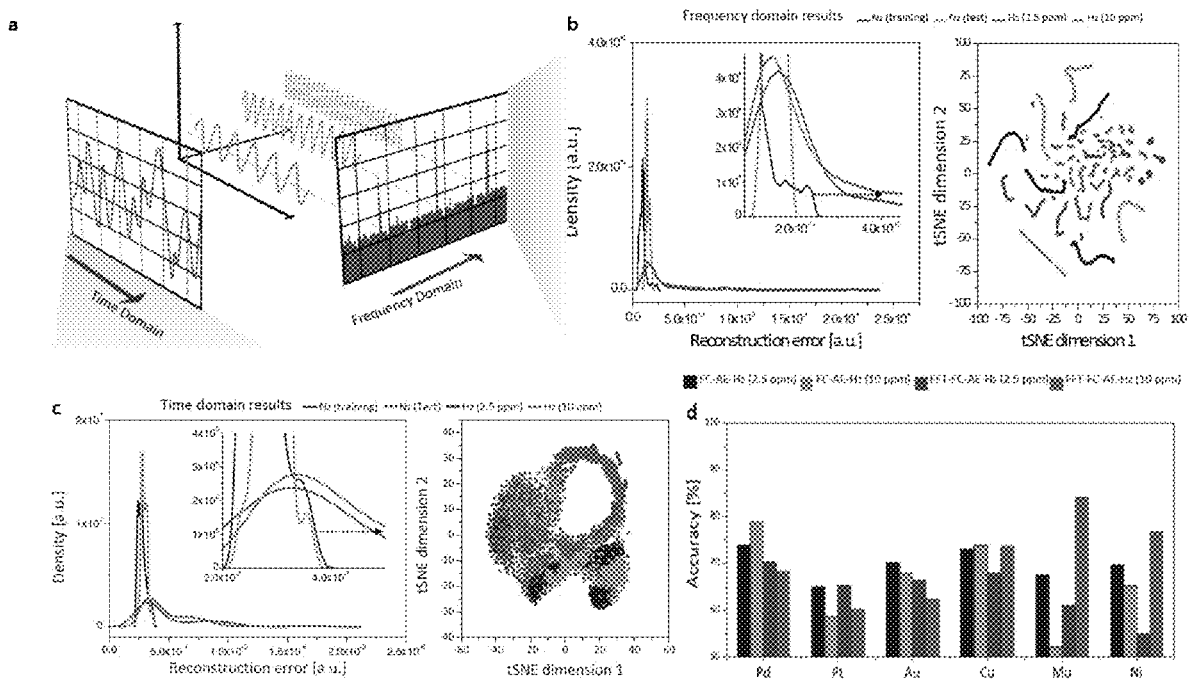
FIG. 8 shows noise signal analysis results based on deep learning according to an embodiment of the present invention, wherein (a) is a schematic view showing a time or frequency domain signal, (b) is a kernel density plot graph copying the distribution of reconstruction errors (REs) of a GRU-AE artificial neural network trained with a resistance signal of a Pd sensor as basic data and a dispersion graph of a t-SNE component obtained in a latent space in an autoencoder, (c) is a kernel density plot graph copying the distribution of reconstruction errors obtained through an FFT-GRU-AE artificial neural network trained with frequencies of a Pd sensor and a dispersion graph of a t-SNE component obtained in a latent space in an autoencoder, and (d) is a graph showing performance of all metal sensors obtained after a critical value of RE capable of maximally increasing anomaly classification accuracy of the GRU-AE and FFT-GRU-AE artificial neural networks is optimized.
Figure 9:
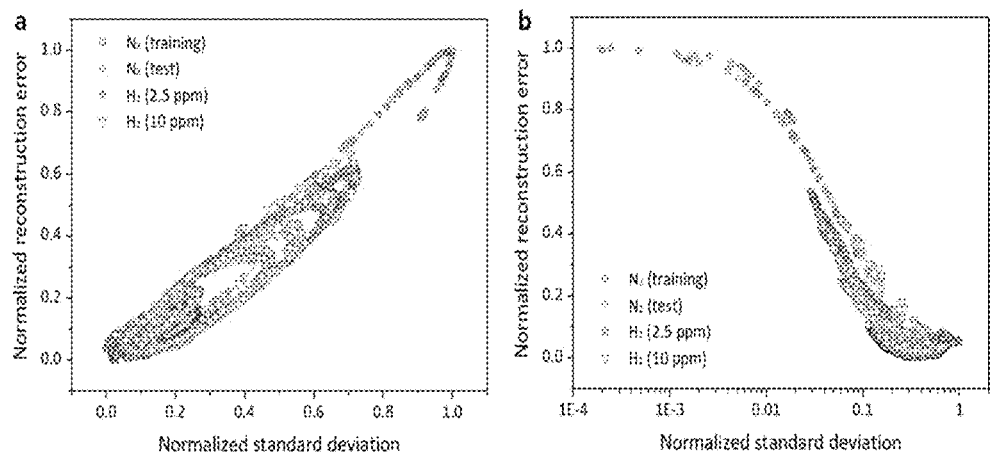
FIG. 9 shows statistical analysis of feature extraction according to an embodiment of the present invention, wherein (a) is a graph showing a relationship between RE values normalized from 4000 Pd samples of the GRU-AE artificial neural network and a normalized standard deviation and (b) is a graph showing a relationship between normalized RE values of the FFT-GRU-AE artificial neural network and a normalized average strength of an FFT frequency.

Continuous reference values were applied within a range of total RE values of the test set (test $N_2$, test $H_2$) excluding trained RE (train $N_2$) to calculate accuracy of all metal sensors while having a reference value enabling the highest accuracy to be provided. As a result, as shown in FIG. 8, it was confirmed that the average accuracy values of GRU-AE for $H_2$ (2.5 ppm) and $H_2$ (10 ppm) are 70.0±3.0% and 66.2±8.9%, respectively, and the average accuracy values of FFT-GRU-AE for $H_2$ (2.5 ppm) and $H_2$ (10 ppm) are

TABLE 3

| Case | No denoising | Wavelet denoising | Wavelet + low pass filter denoising | Wavelet + high pass filter denoising | SVD denoising |
|---|---|---|---|---|---|
| GRU-based autoencoder (Our work) | ROC-AUC (2.5 ppm) 0.828/ ROC-AUC (10 ppm) 0.884 | 0.797/0.857 | 0.778/0.827 | 0.502/0.555 | 0.807/0.858 |
| Statistical based Gaussian mixture model | 0.758/0.788 | 0.663/0.705 | 0.568/0.624 | 0.538/0.568 | 0.687/0.582 |
| Statistical based histogram | 0.812/0.851 | 0.665/0.649 | 0.718/0.733 | 0.556/0.506 | 0.736/0.740 |
| Cluster based K-means | 0.492/0.500 | 0.5025/0.4975 | 0.5355/0.4675 | 0.5175/0.4785 | 0.4995/0.5035 |

64.4±5.0% and 70.9±8.3%, respectively, whereby the two neural networks exhibit similar performance.

For $H_2$ (2.5 ppm), the highest accuracy scores were given in order of Pd (73.8±4.3%), Cu (73.1±12.0%), Au (70.2±5.3%), Ni (69.7±4.7%), Mo (67.6±3.6%), and Pt (65.5±6.6%) irrespective of the neural networks used.

For $H_2$ (10 ppm), the highest accuracy scores were given in order of Mo (84.1±9.0%), Pd (79.0±6.7%), Ni (76.8±7.9%), Cu (73.9±10.6%), Au (67.8±6.7%), and Pt (60.2±5.3%).

In the case in which a reference value of 50% is given as the accuracy score for random estimation in classification, it can be seen that a hidden signal of $H_2$ can be extracted from all metals using one of the neural networks (or using both neural networks). It was confirmed that Pt, which is a well-known $H_2$ detection substance, has the least information related to a signal hidden in such a low ppm value.

Example 4: Utilization of Trained Model

A gas including hexane ($C_6H_{14}$) was supplied to the Pd sensor in order to measure a noise signal, and the measured noise signal was analyzed.

Figure 10:
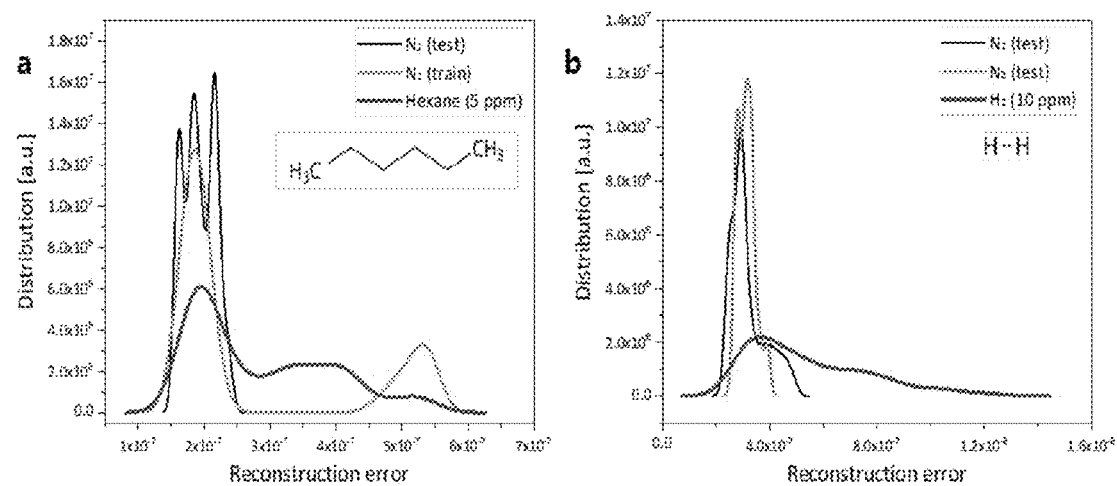
FIG. 10 is a graph showing the result of detection of a target substance (hexane) other than $H_2$ according to an embodiment of the present invention performed by a Pd sensor, wherein (a) shows the noise analysis result of 5 ppm hexane and (b) shows the noise analysis result of 10 ppm $H_2$.

As a result, as shown in FIG. 10, it was confirmed that it is possible to detect 5 ppm of hexane with high accuracy.

Figure 11:
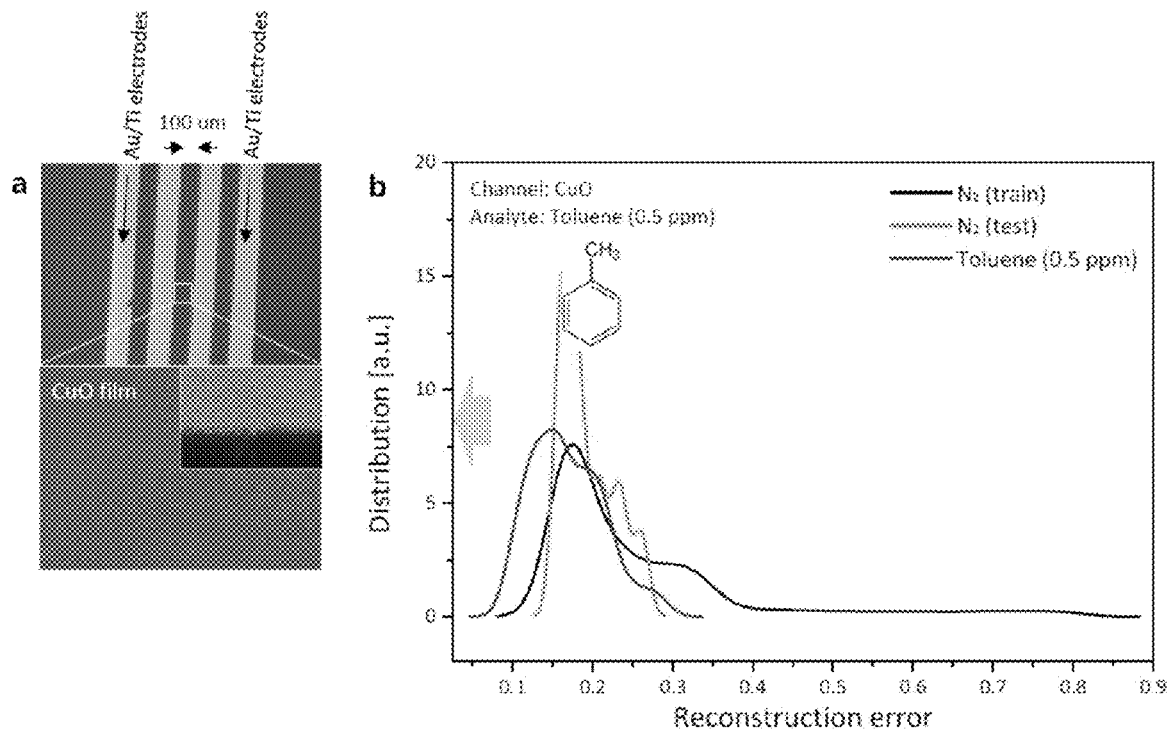
FIG. 11 shows a detection method and result of volatile organic compounds (VOCs) according to an embodiment of the present invention, wherein (a) is an electron microscope photograph of a CuO sensor, which is a kind of metal oxide semiconductor sensor, and (b) shows the result of detection of toluene through the method according to the present invention using the sensor.
Figure 12:
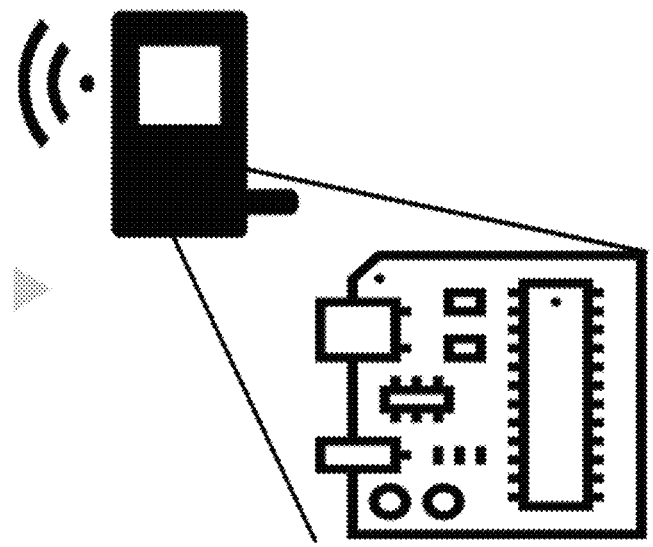
FIG. 12 is a conceptual view showing a target signal detection sensor including the apparatus according to the embodiment of the present invention.

In addition, toluene gas was supplied to a CuO film (20 nm) sensor, which is a metal oxide semiconductor, in order to measure a noise signal, and the measured noise signal was analyzed. As a result, it was confirmed that it is possible to detect 0.5 ppm of toluene, which is less than a measurement limit, through noise signal analysis (FIG. 11).

Although specific configurations of the present invention have been described in detail, those skilled in the art will appreciate that the above description is provided to set forth preferred embodiments for illustrative purposes and should not be construed as limiting the scope of the present invention. Therefore, the substantial scope of the present invention is defined by the accompanying claims and equivalents thereto.

What is claimed is:

1. A computer implemented method of lowering a limit of detection of a target signal based on deep learning comprising:
    (a) receiving a noise signal from a sensor; and
    (b) inputting the noise signal to an artificial neural network capable of determining whether or not the target signal is present, and then determining whether or not the target signal is present,
    wherein the sensor is a solid sensor, an electrochemical sensor, an infrared sensor, or an optical ion sensor;
    wherein the noise signal is a signal less than the limit of detection (LOD) of the sensor;
    wherein the noise signal is converted to a vector for inputting to the artificial neural network;
    wherein the artificial neural network is trained with a second noise signal comprising no target signal;
    wherein the artificial neural network is a GRU (gated recurrent units)-based autoencoder;
    wherein, in the step of determining whether or not the target signal is present, the artificial neural network reconstructs, analyzes, and determines the input noise signal;
    wherein the analysis comprises comparing a reconstruction error rate of the noise signal comprising no target signal with a reconstruction error rate of the input noise signal and determining that the target signal is included when a result of comparison exceeds a reference value;
    wherein the reconstruction error rate is calculated by using Equation 1:

$$RE = 1/N\Sigma_{i=1}^{N}(Y_i - \hat{Y}_i)^2 \qquad \text{Equation 1:}$$

wherein N is a vector length of a time-series sample, $Y_i$ is a sample value of time i for a given input vector, and $\hat{Y}_i$ is a reconstructed output value, and
    wherein the target signal is selected from the group consisting of gas, volatile organic compounds (VOCs), antigen, flames, specific blood biomarkers, radiation, leakage, and deformation.

2. A non-transitory computer-readable storage medium storing a command configured to be executed by a processor configured to lower a limit of detection of a target signal, wherein
    the command is configured to be executed by the processor configured to detect the target signal through:
    (a) receiving a noise signal from a sensor; and
    (b) inputting the noise signal to an artificial neural network capable of determining whether or not the target signal is present, and then determining whether or not the target signal is present,
    wherein the sensor is a solid sensor, an electrochemical sensor, an infrared sensor, or an optical ion sensor;
    wherein the noise signal is a signal less than the limit of detection (LOD) of the sensor;
    wherein the noise signal is converted to a vector for inputting to the artificial neural network;
    wherein the artificial neural network is trained with a second noise signal comprising no target signal;
    wherein the artificial neural network is a GRU (gated recurrent units)-based autoencoder;
    wherein, in the step of determining whether or not the target signal is present, the artificial neural network reconstructs, analyzes, and determines the input noise signal;
    wherein the analysis comprises comparing a reconstruction error rate of the noise signal comprising no target signal with a reconstruction error rate of the input noise signal and determining that the target signal is included when a result of comparison exceeds a reference value;
    wherein the reconstruction error rate is calculated by using Equation 1:

$$RE = 1/N\Sigma_{i=1}^{N}(Y_i - \hat{Y}_i)^2 \qquad \text{Equation 1:}$$

wherein N is a vector length of a time-series sample, $Y_i$ is a sample value of time i for a given input vector, and $\hat{Y}_i$ is a reconstructed output value, and
    wherein the target signal is selected from the group consisting of gas, volatile organic compounds (VOCs), antigen, flames, specific blood biomarkers, radiation, leakage, and deformation.

* * * * *